US011767077B2

(12) United States Patent
Lee

(10) Patent No.: US 11,767,077 B2
(45) Date of Patent: Sep. 26, 2023

(54) QUICK RELEASE STRUCTURE

(71) Applicant: Chung-Che Lee, Taichung (TW)

(72) Inventor: Chung-Che Lee, Taichung (TW)

(*) Notice: Subject to any disclaimer, the term of this patent is extended or adjusted under 35 U.S.C. 154(b) by 600 days.

(21) Appl. No.: 16/945,159

(22) Filed: Jul. 31, 2020

(65) Prior Publication Data

US 2021/0094649 A1 Apr. 1, 2021

(30) Foreign Application Priority Data

Oct. 1, 2019 (TW) ................ 108135430

(51) Int. Cl.
*B62K 25/02* (2006.01)
(52) U.S. Cl.
CPC .......... *B62K 25/02* (2013.01); *B62K 2206/00* (2013.01)
(58) Field of Classification Search
CPC ........... B62K 25/02; B62K 2206/00; B62K 2025/025; B60B 27/02; B60B 27/023; B60B 27/026
USPC ...................................... 301/124.2
See application file for complete search history.

(56) References Cited

U.S. PATENT DOCUMENTS

2016/0114626 A1* 4/2016 Schlanger ............. B60B 27/026
301/124.2

FOREIGN PATENT DOCUMENTS

| CN | 10614657 | * | 1/2017 |
|---|---|---|---|
| TW | M457653 | * | 7/2013 |
| TW | 502622 | * | 6/2015 |
| TW | M544459 | * | 7/2017 |
| TW | M562807 | * | 7/2018 |
| TW | 2086983 | * | 4/2019 |
| TW | M579611 U | | 6/2019 |

* cited by examiner

*Primary Examiner* — S. Joseph Morano
*Assistant Examiner* — Eva L Comino
(74) *Attorney, Agent, or Firm* — Muncy, Geissler, Olds & Lowe, P.C.

(57) ABSTRACT

A quick release structure includes a rod member, an arm member, a restriction member, and a pushing means. The rod member includes a toothed member having a plurality of rows of first teeth arranged spacedly thereon. The arm member has a plurality of rows of second teeth arranged spacedly on its inner peripheral surface. The arm member is sleeved on the toothed member and is axially slidable. The restriction member is disposed on the rod member. The pushing means is arranged between the rod member and the arm member to make the rows of first teeth and the rows of second teeth being engaged normally. When the arm member is moved axially to a rotation position, the rows of first teeth and the rows of second teeth are staggered and aligned alternately so that the arm member is rotatable relative to the rod member.

10 Claims, 11 Drawing Sheets

US 11,767,077 B2

QUICK RELEASE STRUCTURE

BACKGROUND OF THE INVENTION

Field of the Invention

The present invention relates to a quick release structure.

Description of the Prior Art

Generally speaking, the bicycle quick release device includes a shaft and a handle portion. The shaft is connected to the bicycle. The shaft is rotated by the handle portion. When the shaft has been rotated to be in a required position, the handle portion may be in a unsuitable position which may cause obstacles or danger to riding. There are safety concerns, and it is not aesthetic.

In this regard, there is a type of quick release device whose handle portion is axially slidable relative to the shaft, wherein with engagement or disengagement of the shaft and the handle portion, the handle portion can or cannot drive the shaft to rotate (such as disclosed in TW M579611). When the shaft has been rotated to be in a required position with the handle portion being not in a good position, the handle portion can be axially moved to a position where the shaft and the handle portion are not engaged so that the handle portion can be rotated to a preferred position.

However, in order to ensure that there is sufficient engagement area and driving effect of the handle portion and the shaft, the teeth for engagement must be distributed on a large region to have sufficient area. That is, the handle portion has to be moved for a relatively longer travel distance for disengaging the handle portion and the shaft, which causes difficulty for operation.

The present invention has arisen to mitigate and/or obviate the afore-described disadvantages.

SUMMARY OF THE INVENTION

The major object of the present invention is to provide a quick release structure which is quickly and easily to operate and adjust.

To achieve the above and other objects, a quick release structure is provided, including: a rod member, including an axial member and a toothed member, two opposite ends of the axial member having a driving end and a connecting end, the toothed member being disposed on the connecting end and an outer peripheral surface of the toothed member having a plurality of rows of first teeth disposed thereon and spaced apart from one another along an axial direction of the axial member, each of the plurality of rows of first teeth including a plurality of first toothed portions arranged spacedly around the axial direction and protruding from the outer peripheral surface of the toothed member; an arm member, including a sleeving portion and a handle portion, the handle portion being disposed at a side of the sleeving portion and extending in a direction away from the axial direction, the sleeving portion defining a sleeving hole extending axially, an inner peripheral surface of the sleeving hole having a plurality of rows of second teeth disposed thereon and spaced apart from one another along the axial direction, each of the plurality of rows of second teeth including a plurality of second toothed portions arranged spacedly around the axial direction and protruding from the inner peripheral surface of the sleeving hole, the sleeving portion being sleeved with the toothed member and slidable axially between an engaged position and a rotation position relative to the toothed member; wherein when the sleeving portion is in the engaged position, the plurality of rows of first teeth and the plurality of rows of second teeth correspond to and are engaged with one another so that the arm member is non-rotatable relative to the rod member, when the sleeving portion is in the rotation position, the plurality of rows of first teeth and the plurality of rows of second teeth are staggered and disengaged with one another and aligned alternately in the axial direction so that the arm member is rotatable relative to the rod member; a restriction member, an end of the restriction member being connected with the connecting end, another end of the restriction member being configured to block the arm member from being detached axially from the rod member; a pushing means, disposed between the connecting end and the sleeving portion so that the sleeving portion is normally in the engaged position.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
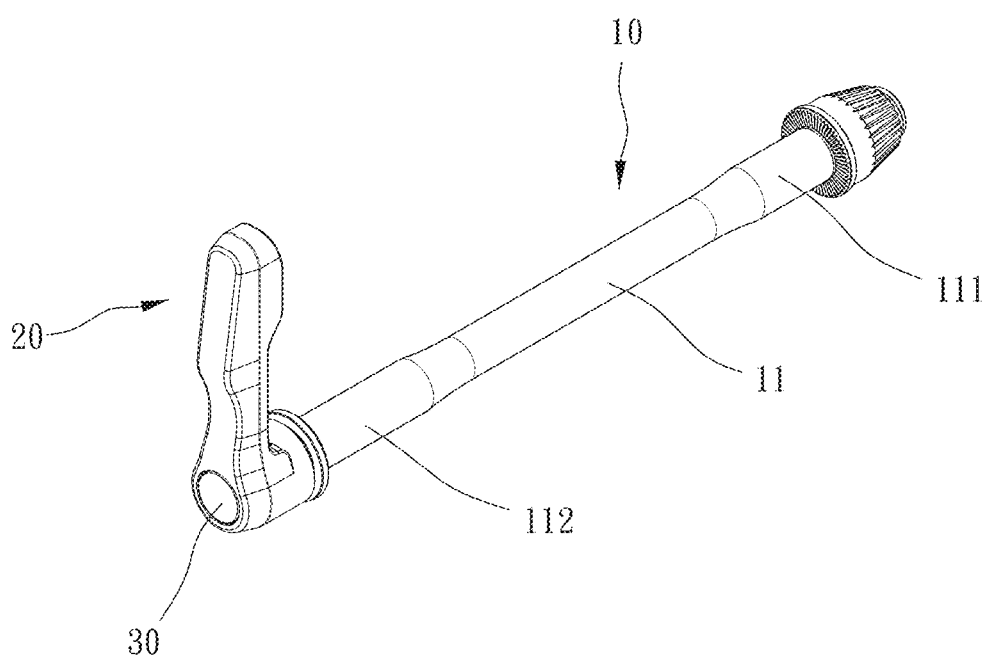
FIG. 1 is a stereogram of a first embodiment of the present invention.
Figure 2:
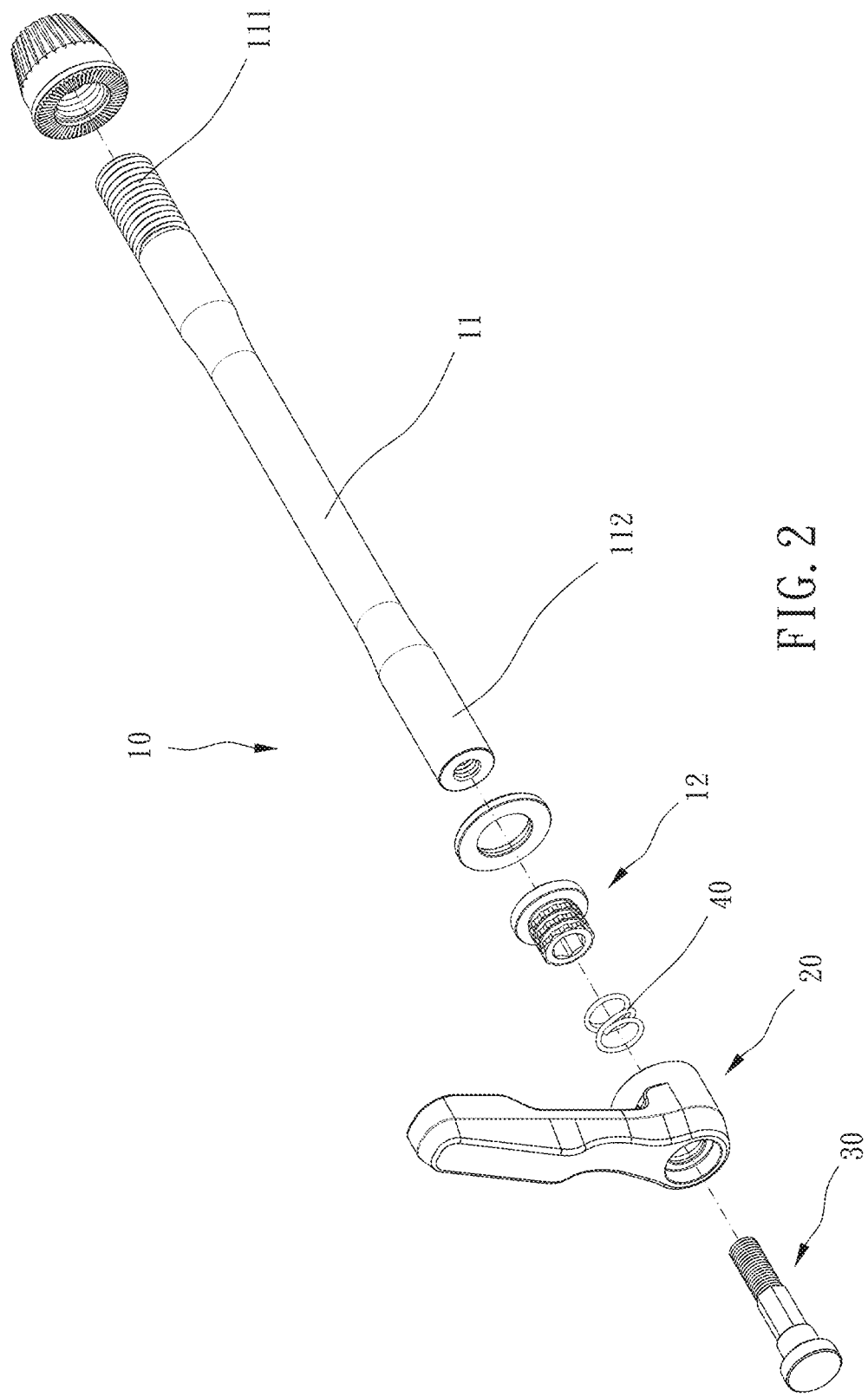
FIG. 2 is a breakdown view of FIG. 1.
Figure 3:
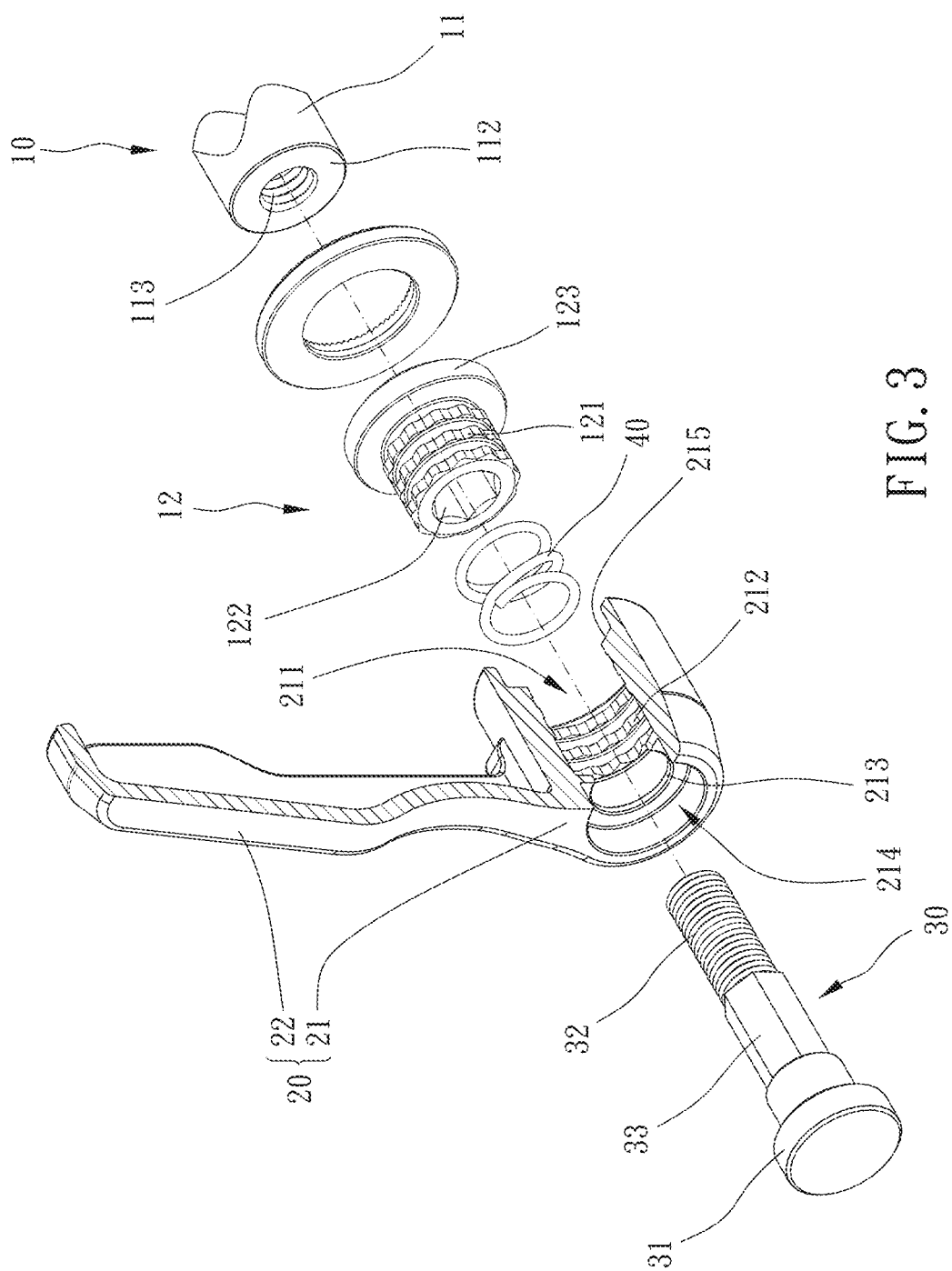
FIG. 3 is a partial enlargement of FIG. 2.

The present invention will be clearer from the following description when viewed together with the accompanying drawings, which show, for purpose of illustrations only, the preferred embodiment in accordance with the present invention.

Please refer to FIGS. 1 to 9 for an embodiment of the present invention. A quick release structure includes a rod member 10, an arm member 20, a restriction member 30 and a pushing means.

The rod member 10 includes an axial member 11 and a toothed member 12, and two opposite ends of the axial member 11 on an axial direction are a driving end 111 and a connecting end 112. The toothed member 12 is disposed on the connecting end 112, and an outer peripheral surface of the rod member 10 includes plurality of rows of first teeth 121 disposed thereon and spaced apart from one another along the axial direction. Each of the plurality of rows of first teeth 121 includes a plurality of first toothed portions arranged spacedly around the axial direction and protruding from the outer peripheral surface of the toothed member. In this embodiment, each of the plurality of rows of first teeth 121 includes twelve said first toothed portions.

Figure 4:
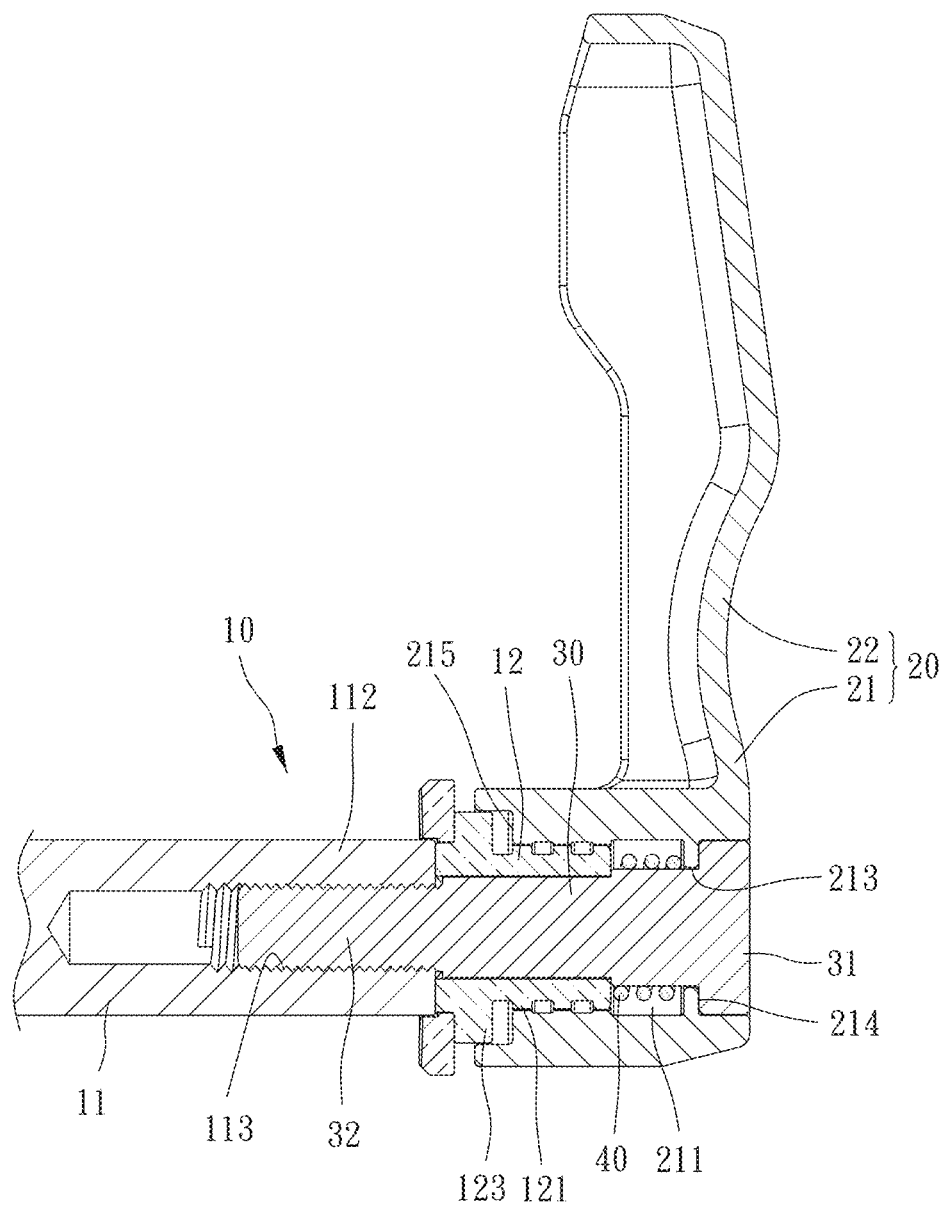
FIGS. 4 and 5 are cross-sectional views of the first embodiment of the present invention.
Figure 5:
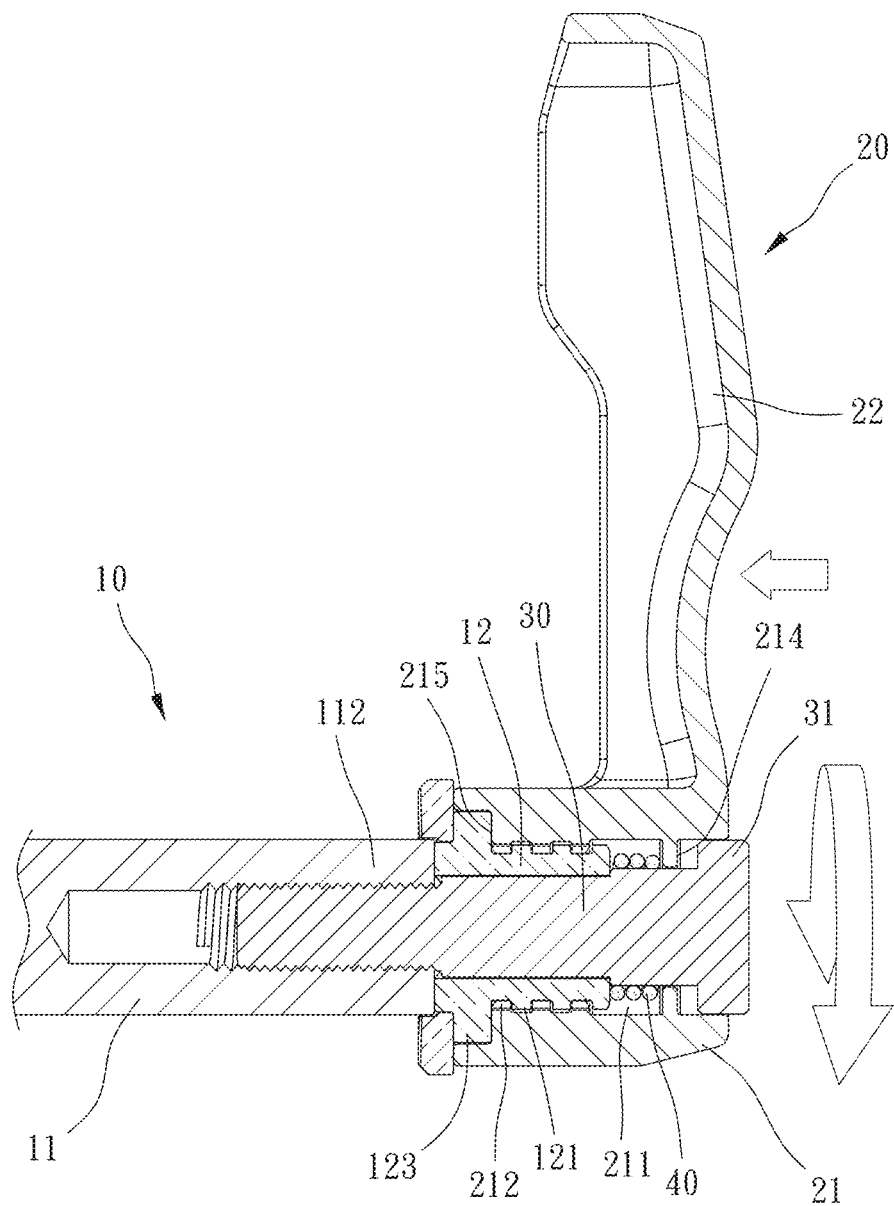
Figure 6:
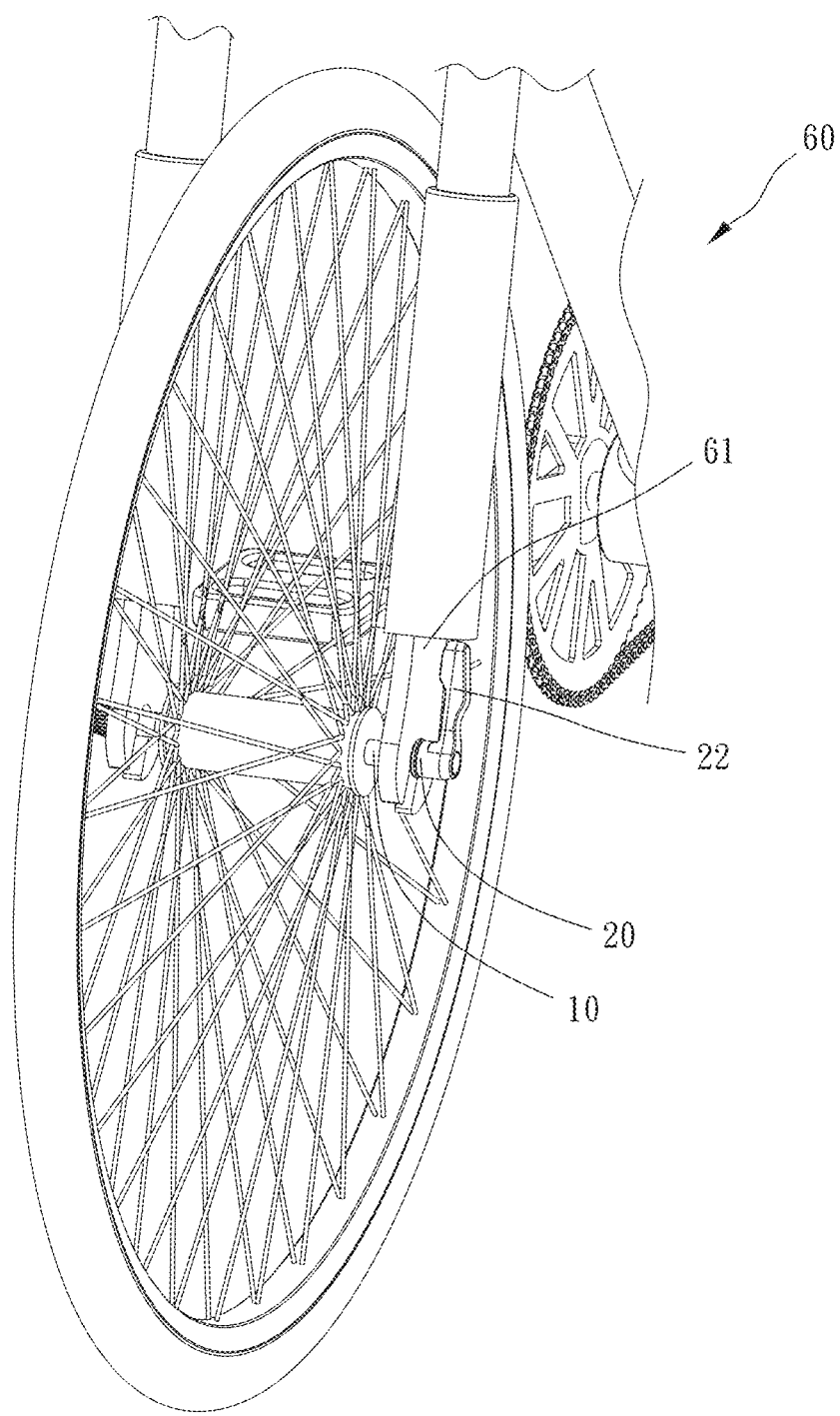
FIG. 6 is a drawing showing operation of the present invention.
Figure 8:
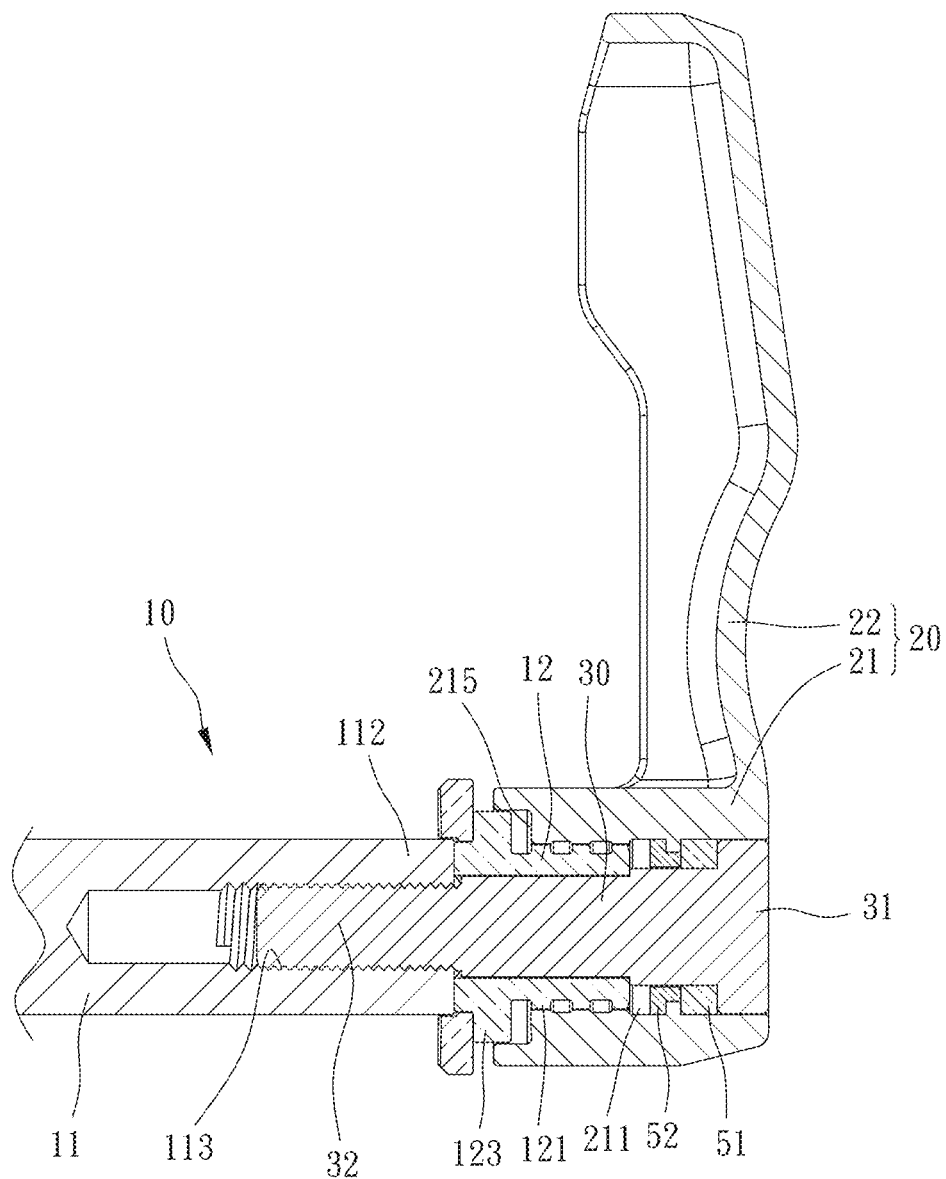
FIGS. 8 and 9 are cross-sectional views of the second embodiment of the present invention.
Figure 9:
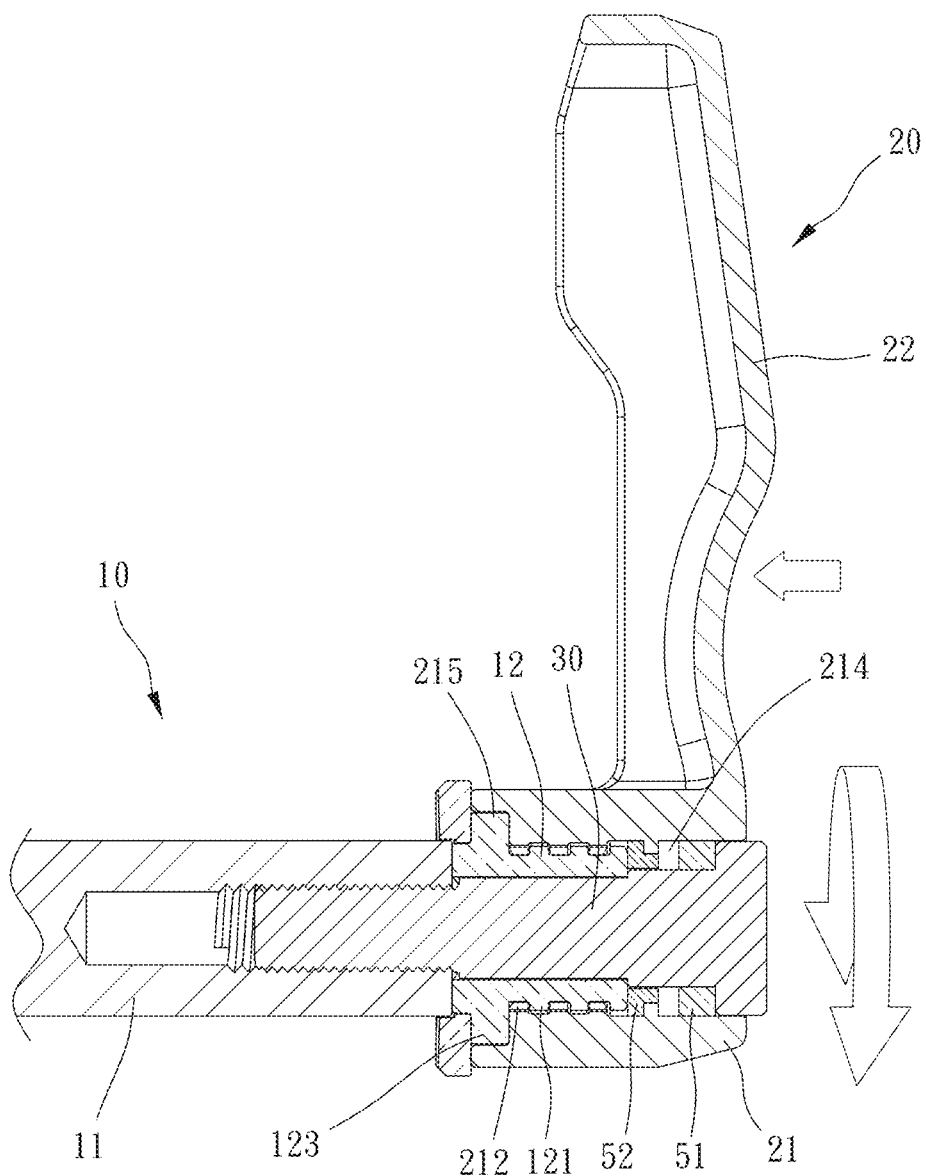

The arm member 20 includes a sleeving portion 21 and a handle portion 22, and the handle portion 22 is disposed at a side of the sleeving portion 21 and extending in a direction away from the axial direction. The sleeving portion 21 axial direction defines a sleeving hole 211 extending axially. An inner peripheral surface of the sleeving hole 211 includes plurality of rows of second teeth 212 disposed thereon and spaced apart from one another along the axial direction. Each of the plurality of rows of second teeth 212 includes a plurality of second toothed portions the axial direction arranged spacedly around the axial direction and protruding from the inner peripheral surface of the sleeving hole. In this embodiment, each of the plurality of rows of second teeth 212 includes twelve said second toothed portions, and the sleeving portion 21 is sleeved with the toothed member 12 and axially slidable between an engaged position (as shown in FIG. 4 or FIG. 8) and a rotation position (as shown in FIG. 5 or FIG. 9). When the sleeving portion 21 is located in the engaged position, the plurality of rows of first teeth 121 and the plurality of rows of second teeth 212 correspond to and are engaged with one another so that the arm member 20 is non-rotatable relative to the rod member 10. When the sleeving portion 21 is located in the rotation position, the plurality of rows of first teeth 121 and the plurality of rows of second teeth 212 are staggered and disengaged with one another and aligned alternately in the axial direction so that the arm member 20 is rotatable relative to the rod member 10.

An end of the restriction member 30 is connected with the connecting end 112, and another end of the restriction member 30 is configured to block the arm member 20 from being detached axially from the rod member 10. Specifically, the restriction member 30 is disposed through the toothed member 12 and the sleeving hole 211 and extends to an end of the sleeving portion 21 away from the rod member 10. An end of the restriction member 30 away from the rod member 10 is enlarged to form a head portion 31. When the sleeving portion 21 is located in the engaged position, the sleeving portion 21 is urged by the pushing means and blocked by the head portion 31 in the axial direction. In this embodiment, the connecting end 112 includes a threaded hole 113 extending axially, the restriction member 30 includes a threaded section 32 screwed with the threaded hole 113, the sleeving portion further includes a through hole 213 in communication with the sleeving hole 211, an inner diametric dimension of the through hole 213 is smaller than an inner diametric dimension of the sleeving hole 211, and the restriction member 30 is disposed through the through hole 213. Preferably, a receiving space 214 is disposed at an end of the sleeving portion 21 away from the rod member 10, the receiving space 214 is in communication with the through hole 213. An inner diametric dimension of the receiving space 214 is greater than an inner diametric dimension of the through hole 213, and the head portion 31 is blockably received within the receiving space 214.

In this embodiment, the restriction member 30 further includes a polygonal section 33, the polygonal section 33 is located between the threaded section 32 and the head portion 31, the toothed member 12 axial direction includes a polygonal hole 122 extending axially therethrough, and the polygonal section 33 is disposed through the polygonal hole 122 so that the toothed member 12 is non-rotatable relative to the restriction member 3.

Figure 7:
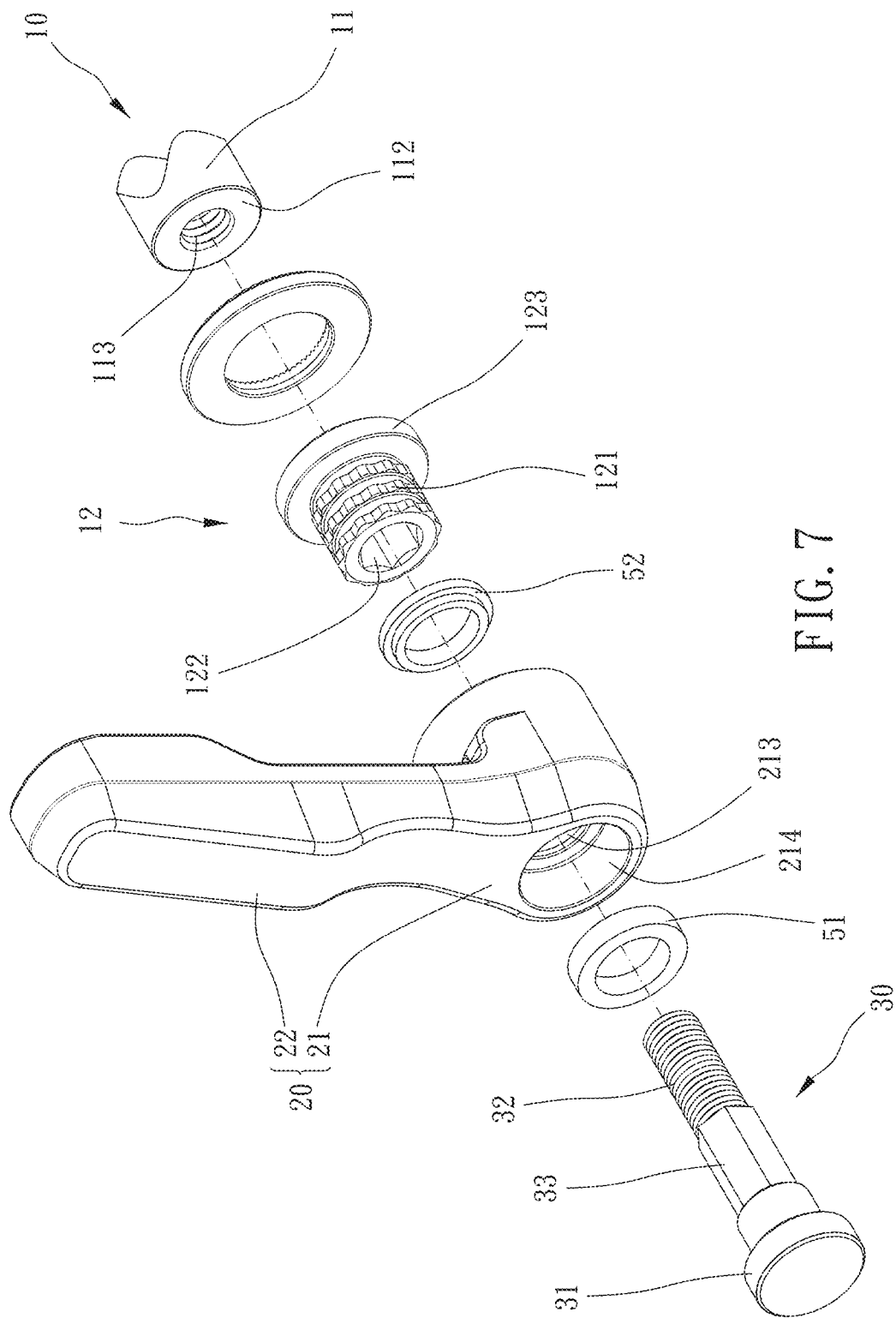
FIG. 7 is a breakdown view of a second embodiment of the present invention.

The pushing means is disposed between the connecting end 112 and the sleeving portion 21 so that the rod member 10 and the arm member 20 is normally in the engaged position. In an embodiment as shown in FIGS. 1 to 5, the pushing means is a spring 40, the spring 40 is received in the sleeving hole 211, abutted against the toothed member 12 and disposed around the restriction member 30. In an alternative embodiment as shown in FIGS. 7 to 9, the pushing means includes a first magnet-attractable member 51 and a second magnet-attractable member 52, the first magnet-attractable member 51 is disposed on the head portion 31, the second magnet-attractable member 52 is disposed on the sleeving portion 21, and the first magnet-attractable member 51 and the second magnet-attractable member 52 are attractable to each other so that the sleeving portion 21 is normally located in the engaged position. Preferably, the first magnet-attractable member 51 is disposed at an end of the head portion 31 facing toward the rod member 10, and the second magnet-attractable member 52 is ring-shaped and fixed in a portion of the sleeving hole 211 away from the rod member 10.

In this embodiment, an end of the toothed member 12 adjacent to the axial member 11 includes a flange 123 extending axially outward. One of the plurality of rows of first teeth 121 which is closest to the flange 123 than any other of the plurality of rows of first teeth 121 is distanced from the flange 123 in a preset distance. When the sleeving portion 21 is located in the rotation position, an abutting end portion 215 of the sleeving portion 21 adjacent to the axial member 11 is abutted against the flange 123, and one of the plurality of rows of second teeth 212 which is closest to the axial member 11 than any other of the plurality of rows of second teeth 212 is located between the flange 123 and the one of the plurality of rows of first teeth 121 which is closest to the flange 123.

In practice, since the sleeving portion 21 is normally in the engaged position due to action of the pushing means, the rod member 10 is rotatable with the arm member 20; while the sleeving portion 21 is moved axially to be in the rotation position, the plurality of rows of first teeth 121 and the plurality of rows of second teeth 212 are staggered and disengaged with one another, so the sleeving portion 21 is rotatable relative to the toothed member 12, wherein the rod member 10 is not rotatable with the arm member 20. As a result, the handle portion 22 can be easily adjusted to be correspondingly aligned with the fork 61 of the bicycle 60.

Figure 10:
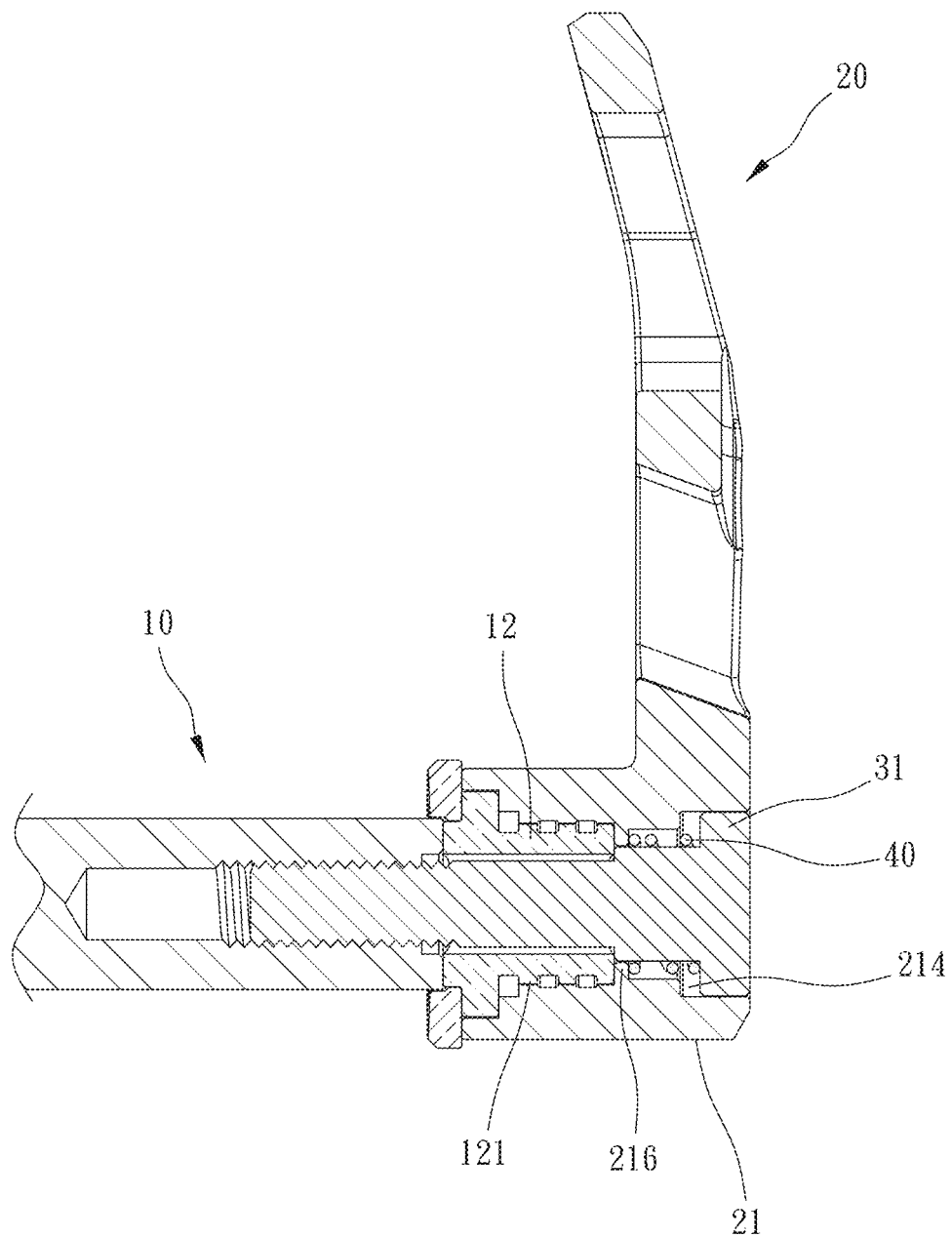
FIGS. 10 and 11 are cross-sectional views of a third embodiment of the present invention.
Figure 11:
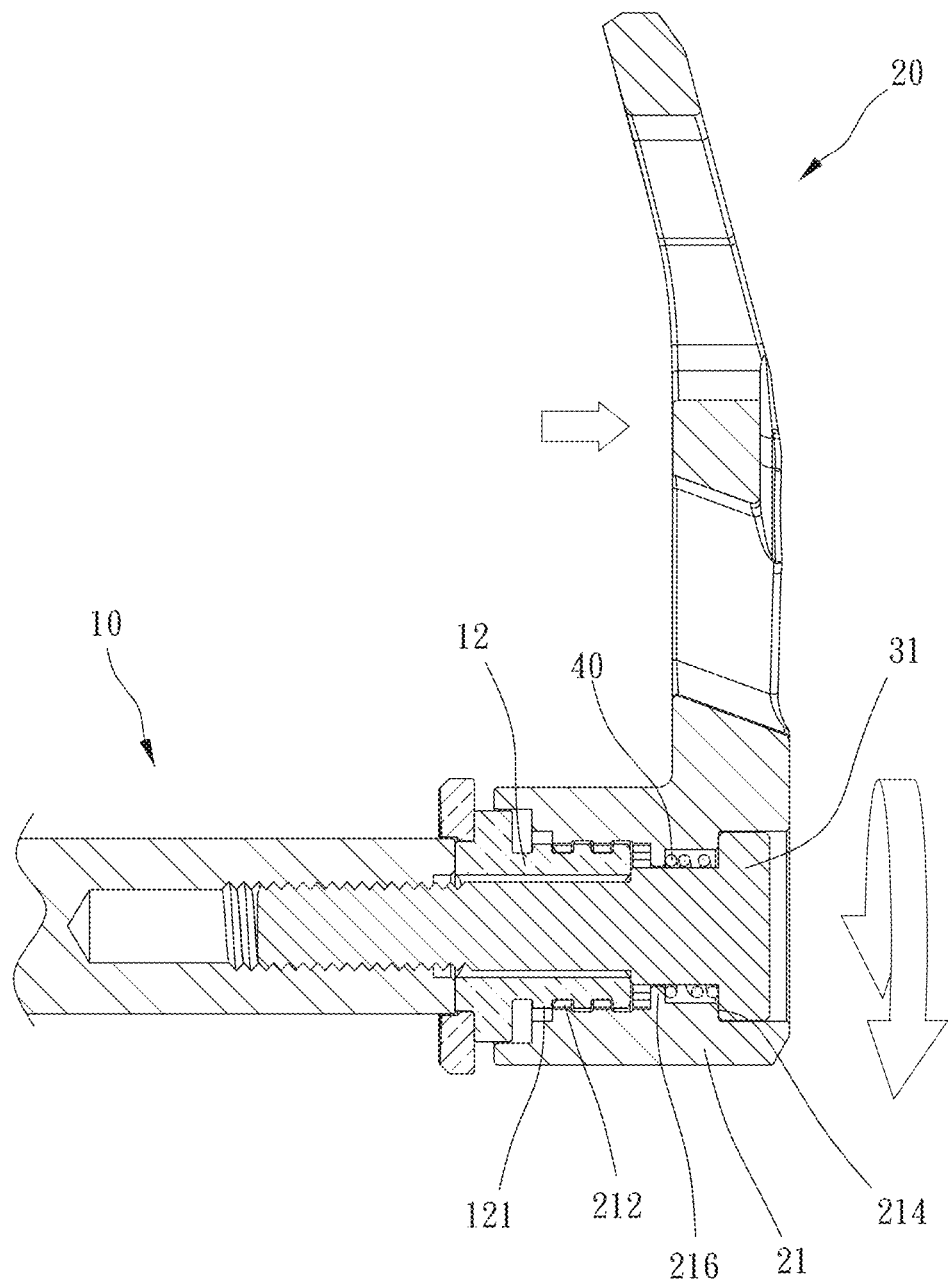

As shown in FIGS. 10 and 11, the sleeving portion 21 includes a protrusion 216 protruding radially inward, and the pushing means is located between the head portion 31 and the protrusion 216. Specifically, the pushing means is a spring 40 abutted against and between the head portion 31 and the protrusion 216 so that the rod member 10 and the arm member 20 and the rod member 10 is normally located in the engaged position. When the sleeving portion 21 is located in the engaged position, the toothed member 12 is axially abutted against the protrusion 216, the plurality of rows of first teeth 121 and the plurality of rows of second teeth 212 are engaged with each other, as shown in FIG. 10, wherein the arm member 20 can drive the rod member 10 to rotate; when the arm member 20 is moved axially away from the rod member 10 to make the sleeving portion 21 be located in the rotation position, the head portion 31 is abutted against the bottom face of the receiving space 214, the plurality of rows of first teeth 121 and the plurality of rows of second teeth 212 are alternately staggered and disengaged from each other, as shown in FIG. 11, and the arm member 20 is rotatable relative to the rod member 10.

With arrangement of the plurality of rows of first teeth 121 and the plurality of rows of second teeth 212, it can provide strong connection and short operational travel distance of the arm member 20 for adjusting the arm member 20. Specifically, since the plurality of rows of first teeth 121 and the plurality of rows of second teeth 212 are axially spaced apart from one another, it only requires the arm member 20 to axially move, relative to the toothed member 12, for a distance of one row of first teeth, and the plurality of rows of first teeth 121 and plurality of rows of second teeth 212 can be staggered and disengaged from each other. Therefore, it is easy to operate, and there is sufficient engagement area of the plurality of rows of first teeth 121 and plurality of rows of second teeth 212.

In sum, with the quick release structure, it requires just a short operational travel distance of the arm member for adjusting the arm member, the arm member can be easily and quickly adjusted to be located in any required position, and there is sufficient engagement area of the plurality of rows of first and second teeth for driving.

While we have shown and described various embodiments in accordance with the present invention, it should be clear to those skilled in the art that further embodiments may be made without departing from the scope of the present invention.

What is claimed is:

1. A quick release structure, including:
   a rod member, including an axial member and a toothed member, two opposite ends of the axial member having a driving end and a connecting end, the toothed member being disposed on the connecting end and an outer peripheral surface of the toothed member having a plurality of rows of first teeth disposed thereon and spaced apart from one another along an axial direction of the axial member, each of the plurality of rows of first teeth including a plurality of first toothed portions arranged spacedly around the axial direction and protruding from the outer peripheral surface of the toothed member;
   an arm member, including a sleeving portion and a handle portion, the handle portion being disposed at a side of the sleeving portion and extending in a direction away from the axial direction, the sleeving portion defining a sleeving hole extending axially, an inner peripheral surface of the sleeving hole having a plurality of rows of second teeth disposed thereon and spaced apart from one another along the axial direction, each of the plurality of rows of second teeth including a plurality of second toothed portions arranged spacedly around the axial direction and protruding from the inner peripheral surface of the sleeving hole, the sleeving portion being sleeved with the toothed member and axially slidable between an engaged position and a rotation position relative to the toothed member; wherein when the sleeving portion is in the engaged position, the plurality of rows of first teeth and the plurality of rows of second teeth correspond to and are engaged with one another so that the arm member is non-rotatable relative to the rod member, when the sleeving portion is in the rotation position, the plurality of rows of first teeth and the plurality of rows of second teeth are staggered and disengaged with one another and aligned alternately in the axial direction so that the arm member is rotatable relative to the rod member;
   a restriction member, an end of the restriction member being connected with the connecting end, another end of the restriction member being configured to block the arm member from being detached axially from the rod member;
   a pushing means, disposed between the connecting end and the sleeving portion so that the sleeving portion is normally in the engaged position;
   wherein an end of the toothed member adjacent to the axial member includes a flange extending axially outward, one of the plurality of rows of first teeth which is closest to the flange than any other of the plurality of rows of first teeth is distanced from the flange in a preset distance, when the sleeving portion is located in the rotation position, an abutting end portion of the sleeving portion adjacent to the axial member is abutted against the flange, and one of the plurality of rows of second teeth which is closest to the axial member than any other of the plurality of rows of second teeth is located between the flange and the one of the plurality of rows of first teeth which is closest to the flange;
   wherein the pushing means biases the sleeving portion axially away from the flange and the axial member.

2. The quick release structure of claim 1, wherein the restriction member is disposed through the toothed member and the sleeving hole and extends to an end of the sleeving portion away from the rod member, an end of the restriction member away from the rod member is enlarged to form a head portion, and when the sleeving portion is located in the engaged position, the sleeving portion is urged by the pushing means and blocked by the head portion of the restriction member in the axial direction.

3. The quick release structure of claim 2, wherein the connecting end of the axial member includes a threaded hole extending axially, the restriction member includes a threaded section screwed with the threaded hole, the sleeving portion further includes a through hole in communication with the sleeving hole, an inner diametric dimension of the through hole is smaller than an inner diametric dimension of the sleeving hole, and the restriction member is disposed through the through hole.

4. The quick release structure of claim 3, wherein a receiving space is disposed at an end of the sleeving portion away from the rod member, the receiving space is in communication with the through hole, an inner diametric dimension of the receiving space is greater than an inner diametric dimension of the through hole, and the head portion is blockably received within the receiving space.

5. The quick release structure of claim 1, wherein the pushing means is a spring, and the spring is received in the sleeving hole and abutted against the toothed member.

6. The quick release structure of claim 2, wherein the pushing means includes a first magnet-attractable member and a second magnet-attractable member, the first magnet-attractable member is disposed on the head portion, the second magnet-attractable member is disposed on the sleeving portion, and the first magnet-attractable member and the second magnet-attractable member are attractable to each other so that the sleeving portion is normally located in the engaged position.

7. The quick release structure of claim 6, wherein the first magnet-attractable member is disposed at an end of the head portion facing toward the rod member, and the second magnet-attractable member is ring-shaped and fixed in a portion of the sleeving hole away from the rod member.

8. The quick release structure of claim 4, wherein the pushing means is a spring, the spring is received in the sleeving hole and abutted against the toothed member; the spring is disposed around the restriction member; each of the plurality of rows of first teeth includes twelve said first toothed portions, each of the plurality of rows of second teeth includes twelve said second toothed portions; the restriction member further includes a polygonal section, the polygonal section is located between the threaded section and the head portion, the toothed member includes a polygonal hole extending axially therethrough, the polygonal section is disposed through the polygonal hole so that the toothed member is non-rotatable relative to the restriction member.

9. The quick release structure of claim 4, wherein the pushing means includes a first magnet-attractable member and a second magnet-attractable member, the first magnet-attractable member is disposed on the head portion, the second magnet-attractable member is disposed on the sleeving portion, the first magnet-attractable member and the second magnet-attractable member are attractable to each other so that the sleeving portion is normally located in the engaged position; is disposed at an end of the head portion facing toward the rod member, the second magnet-attractable member is ring-shaped and fixed in a portion of the sleeving hole away from the rod member; each of the plurality of rows of first teeth includes twelve said first toothed portions, each of the plurality of rows of second teeth includes twelve said second toothed portions; the restriction member further includes a polygonal section, the polygonal section is located between the threaded section and the head portion, the toothed member includes a polygonal hole extending axially therethrough, the polygonal section is disposed through the polygonal hole so that the toothed member is non-rotatable relative to the restriction member; one of the plurality of rows of second teeth which is closest to the axial member than any other of the plurality of rows of second teeth is located between the flange and the one of the plurality of rows of first teeth which is closest to the flange.

10. The quick release structure of claim 1, wherein the restriction member is disposed through the toothed member and the sleeving hole and extends to an end of the sleeving portion away from the rod member, an end of the restriction member away from the rod member is enlarged to form a head portion, the sleeving portion includes a protrusion protruding radially inward, the pushing means is located between the head portion and the protrusion, and when the sleeving portion is located in the engaged position, the toothed member is axially abutted against the protrusion.

* * * * *